(12) United States Patent
Eriksson

(10) Patent No.: US 10,082,201 B2
(45) Date of Patent: Sep. 25, 2018

(54) ARRANGEMENT FOR ROTATIONAL DECOUPLING OF ENGINE AND TRANSMISSION

(71) Applicant: Volvo Car Corporation, Gothenburg (SE)

(72) Inventor: Soren Eriksson, Kungalv (SE)

(73) Assignee: Volvo Car Corporation, Gothenborg (SE)

( * ) Notice: Subject to any disclaimer, the term of this patent is extended or adjusted under 35 U.S.C. 154(b) by 0 days.

(21) Appl. No.: 15/370,577

(22) Filed: Dec. 6, 2016

(65) Prior Publication Data
US 2017/0184192 A1 Jun. 29, 2017

(30) Foreign Application Priority Data
Dec. 23, 2015 (EP) .................................... 15202307

(51) Int. Cl.
| | | |
|---|---|---|
| *F16H 57/025* | (2012.01) | |
| *B60K 5/12* | (2006.01) | |
| *F16H 57/028* | (2012.01) | |
| *B60K 5/04* | (2006.01) | |
| *B60K 17/08* | (2006.01) | |
| *B62D 21/11* | (2006.01) | |
| *F16H 57/02* | (2012.01) | |

(52) U.S. Cl.
CPC ............. *F16H 57/025* (2013.01); *B60K 5/04* (2013.01); *B60K 5/1208* (2013.01); *B60K 5/1216* (2013.01); *B60K 5/1266* (2013.01); *B60K 17/08* (2013.01); *B62D 21/11* (2013.01); *F16H 57/028* (2013.01); *B60Y 2306/09* (2013.01); *B60Y 2400/48* (2013.01); *F16H 2057/02026* (2013.01)

(58) Field of Classification Search
CPC ................. F16H 57/025; F16H 57/028; F16H 2057/02026; B60K 5/1208; B60K 17/08; B60K 5/1266; B60K 5/1216; B60K 5/04; B62D 21/11; B60Y 2306/09; B60Y 2400/48
See application file for complete search history.

(56) References Cited

U.S. PATENT DOCUMENTS 2,199,517 A * 5/1940 Best ......................... B60K 5/00
  180/291
3,998,290 A 12/1976 Sivers et al.
(Continued)

FOREIGN PATENT DOCUMENTS

| DE | 4200872 A1 | 11/1992 |
|---|---|---|
| EP | 1650070 A1 | 4/2006 |
| EP | 1686042 A1 | 8/2006 |

*Primary Examiner* — Darlene P Condra
(74) *Attorney, Agent, or Firm* — Snyder, Clark, Lesch & Chung, LLP

(57) ABSTRACT

The invention relates to a vehicle powertrain that includes an internal combustion engine, a transmission driving at least two wheels, and an intermediate unit connecting the engine and a transmission housing enclosing the transmission. The intermediate unit is configured to allow relative rotation between the engine and the transmission housing about an axis (X) that is colinear with an engine output shaft and a transmission input shaft. The arrangement prevents engine vibrations from being transmitted to the transmission, and prevents torque shock from the vehicle wheels from being transmitted to the engine.

20 Claims, 7 Drawing Sheets

(56) References Cited

U.S. PATENT DOCUMENTS

| | | | |
|---|---|---|---|
| 4,300,649 A * | 11/1981 | Sakata | B60K 5/04 |
| | | | 180/291 |
| 4,483,408 A * | 11/1984 | Yazaki | B60K 17/16 |
| | | | 180/297 |
| 4,709,778 A | 12/1987 | Von Sivers | |
| 4,883,142 A * | 11/1989 | Rispeter | B60K 17/16 |
| | | | 180/245 |
| 4,889,207 A | 12/1989 | Von Broock | |
| 5,065,831 A * | 11/1991 | Murakami | B60K 5/02 |
| | | | 180/292 |
| 5,074,374 A | 12/1991 | Ohtake et al. | |
| 6,702,057 B1 * | 3/2004 | Bartel | B60G 11/04 |
| | | | 180/292 |
| 2007/0260377 A1 | 11/2007 | Miyahara et al. | |
| 2013/0112840 A1 * | 5/2013 | Glover | B60K 5/1241 |
| | | | 248/603 |
| 2015/0053496 A1 | 2/2015 | Jomaa et al. | |

* cited by examiner

ARRANGEMENT FOR ROTATIONAL DECOUPLING OF ENGINE AND TRANSMISSION

TECHNICAL FIELD

The invention relates to an arrangement for reducing noise and vibrations in a powertrain. The arrangement prevents engine block vibrations from being transmitted to the vehicle body, and prevents torque shock from the vehicle wheels from being transmitted to the engine.

BACKGROUND

Conventional motor vehicles are provided with a powertrain comprising an internal combustion engine and a transmission for driving at least two wheels. The transmission comprises a gearbox mounted directly onto the engine, usually to the engine block. Vibrations generated by the engine or the transmission are dampened by passive or active damper means mounted between the powertrain and the vehicle frame, or a sub-frame attached to the vehicle frame. Such damper means can comprise elastic mounts or bushings.

US2007260377 discloses a conventional vehicle powertrain supporting apparatus where a transversely-mounted powertrain comprises an engine and a transmission arranged in a vehicle transvers direction. The engine and a transmission are connected to each other and are mounted on a vehicle body via a sub-frame and elastic dampers.

EP1650070A1 discloses an active engine mount for reducing vibration between a motor vehicle and a motor vehicle powertrain. The engine mount comprises at least a first damper means and a second damper means, located at either end of said power train and in respective vertical planes parallel to the crankshaft, and at least one controllable tie bar located in a plane substantially transverse to the crankshaft. The controllable tie bar is provided with means for adjusting the length of the damper in response to an output signal from an electronic control unit.

Powertrain suspensions of the above types will provide acceptable suppression of engine vibrations under many operating conditions. However, in some operating conditions sacrifices in terms of ride comfort must be accepted, as a consequence of torque oscillations in the powertrain or induced torque shock from one or more vehicle wheels transmitted via the transmission to the vehicle frame.

Hence there exists a need for an improved powertrain and powertrain mounts for reducing forces transferred to or from a drive unit located in a vehicle frame. Further, there exists a need for solving the combined problem of isolating and reducing both vibrations and excessive oscillations caused by engine motions or torque shock from the wheels.

SUMMARY

An object of the invention is to provide a powertrain that solves the above problems relating to isolation and reduction of vibrations and oscillations. The object is achieved by a powertrain according to claim 1.

In this text the term "powertrain" is defined as comprising an internal combustion engine, or engine, and a transmission. Here, a transmission comprises a gearbox connected to the engine and output shafts for at least two driving wheels. Consequently, the terms "transmission input shaft" and "gearbox input shaft" refer to the same component and are interchangeable. The gearbox can be a manual or an automatic gearbox and is enclosed by a transmission housing. The text will refer to dampening of "engine vibrations", which term refers to dampening of vibrations in non-rotating engine and transmission components, unless otherwise specified.

According to one embodiment, the invention relates to a vehicle powertrain comprising an internal combustion engine, a transmission driving at least two wheels, and an intermediate unit arranged to connect the engine and a housing enclosing the transmission. The intermediate unit is arranged to allow relative rotation between the engine and the transmission housing about a single axis that is collinear with, i.e. coincides with, an engine output shaft and a transmission input shaft. In this context, the transmission input shaft is the input shaft for a manual or automatic gearbox driven by the engine. Relative rotation should only be allowed about the axis through the drive shaft connecting the engine and the gearbox. Any relative movement of the engine and the transmission about a horizontal or vertical axis at right angles to the engine output shaft is undesirable, as it would lead to unbalanced movements and rapid wear of the intermediate unit and any bearings supporting the input/output shafts.

The engine is preferably, but not necessarily a transversely mounted engine adapted for front wheel drive or four-wheel drive. In the subsequent text, the invention will be described in relation to a front wheel drive vehicle provided with a transverse engine.

The intermediate unit comprises a first component arranged on the engine about the engine output shaft and a second component arranged on the transmission housing about the transmission input shaft. According to this example, one or both components can form integrated parts of the engine and the transmission. The first component can be located around the engine output shaft at one end of the engine block, while the second component can be located around the transmission input shaft at the end of the transmission housing facing the engine.

According to an alternative example one or both components can form separate parts which are attachable to the engine block and the transmission housing by suitable means. The intermediate unit can comprise a first component which, for instance, is bolted to the engine about the engine output shaft and the second component can be bolted to the transmission housing about the transmission input shaft at the end of the transmission housing facing the engine.

The powertrain comprising the internal combustion engine and the transmission are mounted to the vehicle via resilient mounts, such as bushings comprising rubber, elastomer materials, or a similar suitable elastic material. The mounts are preferably progressive, in that the resistance to deformation increases with increased loading. The powertrain can be mounted to the vehicle frame or to a sub-frame that is attached to the vehicle frame. A sub-frame of this type is often used in front wheel drive vehicles with a transverse engine. According to the invention, the engine is mounted in a first set of resilient mounts and the transmission housing is mounted in a second set of resilient mounts. The first and second mounts are primarily arranged to dampen rotational vibration and displacement. Additional resilient mounts can be arranged at least one end of the powertrain, e.g. on the engine, to dampen vibration and displacement of the powertrain in the general direction of the common axis through the engine output shaft and the transmission input shaft. Such additional resilient mounts will only have a marginal effect on the damping of rotational vibrations. The exact location of the resilient mounts supporting the engine and the transmission, respectively, can be adapted to each individual engine/transmission configuration. The properties of the resilient mounts will also vary in dependence of their respective distance to the rotational center of the engine and their locations on the engine. The location of each respective resilient mount is not relevant for the invention as such.

According to the invention, the first set of resilient mounts supporting the engine has a lower stiffness than the second set of resilient mounts supporting the transmission. By way of example, the stiffness of the first set of resilient mounts can be up to 10 times lower than that of the second set of resilient mounts. Preferably, the stiffness of the first set of resilient mounts can be between half and a tenth of the stiffness than the second set of resilient mounts. The properties of the second mounts used for a transmission according to the invention can be the same or similar to the properties of conventional engine and transmission mounts in an engine not provided with the inventive intermediate unit. The properties of the first mounts can be selected in dependence on factors such as engine torque and available space for the engine in the engine bay. The stiffness of the first mounts can be dimensioned as a function of the maximum output torque of the engine. The available space for the engine will provide a physical restriction for the rotation of the engine, giving a maximum allowable angular displacement range of, for instance, ±5°. If the stiffness of the first mounts is insufficient for restricting engine rotation within the allowable angular displacement range, then it can be necessary to provide a stop in a suitable location to prevent excessive engine rotation. Such a stop can be provided in the intermediate unit and/or at one or more suitable locations on the engine. Typically, a tie bar can be provided between the engine and the vehicle body.

In this way, the relatively softer engine mounts allow relative rotation of the engine over a predetermined maximum angle. Consequently, rotational engine vibrations generated by the engine, causing it to oscillate about the crankshaft axis, can be dampened by the engine mounts without being transferred through the intermediate unit to the transmission. This has the advantage of isolating the engine from the transmission with respect to rotational vibrations, which allows the relatively stiff transmission mounts to be retained to prevent excessive rotation of the transmission housing relative to the frame or sub-frame when high torque is transferred to the wheels, e.g. during acceleration.

Similarly, an externally induced torque shock from one or more vehicle wheels can be transmitted via a drive shaft into the transmission. The torque is further transmitted through the gearbox to the transmission input shaft, and consequently into the engine. A torque shock of this type can be at least partially dampened by the transmission mounts attached to the vehicle frame or a sub-frame attached to the vehicle frame. However, the intermediate unit and the relatively softer engine mounts provides further dampening of the torque, by allowing a relative rotation between the engine and the transmission. This has the advantage of isolating the engine from the transmission with respect to rotational vibrations, which reduces the magnitude of the torque transmitted from a vehicle wheel to the engine via the transmission housing. By limiting the effect of a torque shock transferred from the wheels to the engine such events can be made less noticeable and more comfortable to the driver, as noise and vibrations are reduced.

In addition to the resilient mounts for damping vibrations in non-rotational parts, as described above, the powertrain can also be provided with additional damping or absorbing means for damping rotational, or torsional vibrations. The powertrain can be provided with at least one tuned mass dampers typically on the crankshaft pulley at the front of the engine to control torsional vibration and/or the bending modes of the crankshaft. Tuned mass dampers can also be used on the driveline for reducing gear whine. Almost all modern cars will have at least one mass damper. Alternative or additional arrangements are centrifugal pendulum absorbers, usually on the flywheel, and tuned mass absorbers, such as a dual mass damper, which can be used to reduce the internal combustion engine's torsional vibrations. Centrifugal pendulum absorbers and tuned mass absorbers of this type are located between the engine and the transmission, for instance in or adjacent a clutch or similar connecting the engine output shaft and the transmission input shaft. The centrifugal pendulum absorber and tuned mass absorbers are based on an absorption principle rather than a dampening principle. The distinction is significant since dampers reduce the vibration amplitude by converting the vibration energy into heat. Absorbers store the energy and return it to the vibration system at the appropriate time. Centrifugal pendulum absorbers, like tuned mass absorbers, are not part of the force/torque flow. The centrifugal pendulum absorber differs from the tuned mass absorber in the absorption range. The centrifugal pendulum absorber is effective for an entire order of frequencies instead of a narrow frequency range.

As indicated above, the intermediate unit is arranged to allow relative rotation between the engine and the transmission housing about a single axis that is colinear with an engine output shaft and a transmission input shaft. According to a first example, the first component and the second component of the intermediate unit can be connected by a bearing arrangement. Such a bearing arrangement can comprise one or more suitable roller or ball bearings and/or a sliding bearing. The bearing arrangement can comprise at least one pre-loaded roller bearing or a ball bearing. According to one embodiment of the first example, the bearing arrangement comprises a pre-loaded double conical roller bearing.

According to a second example, the first component and the second component of the intermediate unit can be connected by a pair of interconnecting flanges, wherein at least one flange has a contact surface comprising a low friction material. Alternatively, both radial and circumferential contact surfaces can comprise a low friction material. The low friction material can comprise a suitable material, such as Teflon© or a similar material, and can be deposited, sprayed or adhesively attached to the desired contact surfaces. According to a further alternative, facing flanges can be separated by at least one annular ring extending radially between facing contact surfaces and comprising a low friction material.

According to a third example, the first component and second component of the intermediate unit are connected by a thread comprising mating helical surfaces. The thread is preferably self-locking to prevent any unintended axial displacement, i.e. displacement not caused by relative rotation between the engine and the transmission. Mating threads can be coated with a low friction material in the same way as described for the second example above.

As indicated above, the gearbox enclosed by the transmission housing can be a manual or an automatic gearbox. According to one example, the intermediate unit is arranged to at least partially enclose a controllable clutch or a torque converter connecting the engine output shaft and the transmission input shaft. According to a further example, the intermediate unit is arranged to at least partially enclose a centrifugal pendulum absorber, tuned mass absorbers and other components on the engine output shaft and/or the transmission input shaft.

One advantage of the invention is that large wheel torques is prevented from hitting the engine suspension, as the engine not bolted to transmission. As the engine not bolted to transmission, much less compromise is required when selecting a suitable stiffness for the engine and transmission mounts. Instead of having to select the same stiffness for both sets of mounts, the inventive intermediate unit allows the engine mounts to be considerably softer than the transmission mounts. This arrangement provides further advantages, in that engine vibrations can be prevented from being transmitted to the transmission, and that torque shock from the vehicle wheel can be prevented from being transmitted to the engine.

BRIEF DESCRIPTION OF THE DRAWINGS

With reference to the appended drawings, below follows a more detailed description of embodiments of the invention cited as examples. In the drawings.

DETAILED DESCRIPTION OF THE PREFERRED EMBODIMENTS

Figure 1:
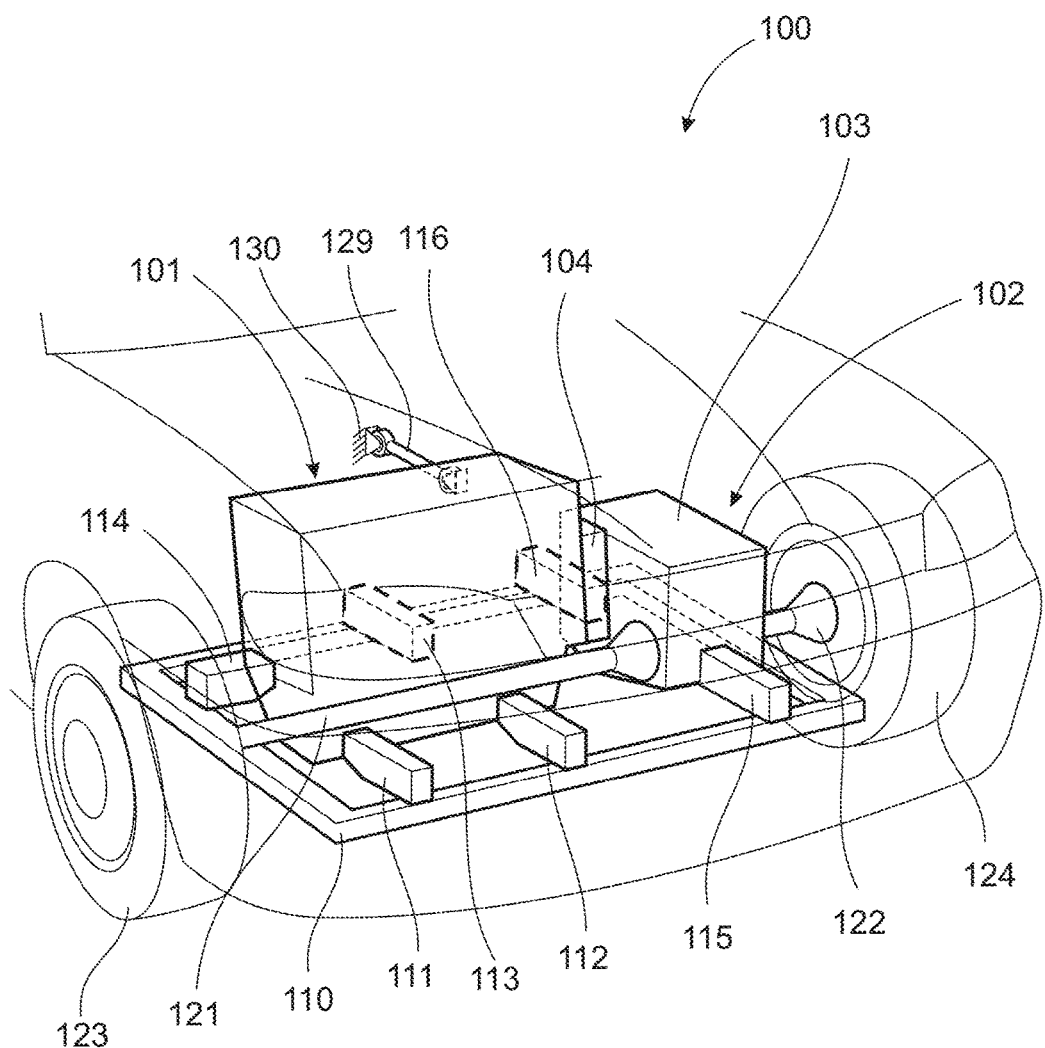
FIG. 1 shows a schematically indicated vehicle with a powertrain according to the invention.

FIG. 1 shows a schematically indicated vehicle 100 with a powertrain comprising a propulsion unit, for instance an internal combustion engine 101, and a transmission 102 drivingly connected to the engine 101. In the case of a manual transmission, a controllable clutch (not shown) would be arranged in a transmission housing 103 enclosing the transmission 102 adjacent the engine 101. The figure further shows an intermediate unit 104 connecting the engine 101 and the transmission 102. The intermediate unit 104 is arranged to allow relative rotation between the engine and the transmission housing about an axis (see FIG. 2) that is colinear with an engine output shaft and a transmission input shaft (not shown).

The engine 101 and the transmission 102 are mounted in a sub-frame 110, which is in turn attached to the vehicle in a conventional manner. The powertrain comprising the engine 101 and the transmission 102 are mounted to the sub-frame 110 by means of two sets of resilient mounts 111, 112, 113, 114 and 115, 116, respectively. The engine 101 is mounted in a first set of resilient mounts 111, 112, 113, 114 and the transmission 102 with its transmission housing 103 is mounted in a second set of resilient mounts 115, 116. The first and second mounts are primarily arranged to dampen rotational vibration and displacement of the powertrain 101, 102. The first set of resilient mounts 111, 112, 113, 114 supporting the engine 101 has a lower stiffness than the second set of resilient mounts 115, 116 supporting the transmission 102. The stiffness of the first set of resilient mounts 115, 116 can be up to a tenth of the stiffness of the second set of resilient mounts 111, 112, 113, 114. The second mounts 115, 116 used for the transmission 102 have the same properties as a set of conventional engine and transmission mounts used for a powertrain of this type.

In FIG. 1 the invention is described for a front wheel drive vehicle where the drive shafts are located in front of the engine, but the inventive concept is equally applicable to a front wheel drive vehicle where the drive shafts are located behind the engine (see FIG. 2), as well as rear wheel drive or four-wheel drive vehicles. In this example, a pair of front wheel drive shafts 121, 122, connected to a respective steerable front wheel 123, 124, is indicated in FIG. 1. The invention is preferably applicable to vehicles provided with a transversely mounted engine as shown in FIG. 1, but can also be used for vehicles with an in-line engine (not shown).

Figure 2:
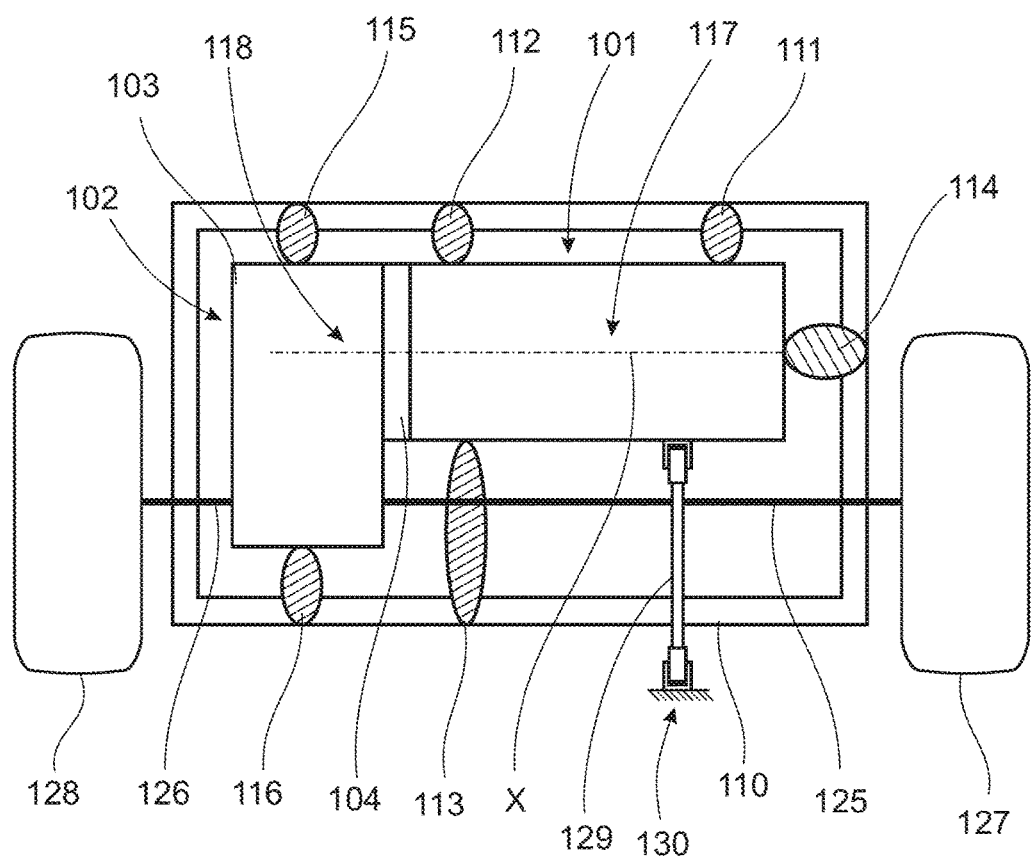
FIG. 2 shows a schematic plan view of the powertrain in FIG. 1.

FIG. 2 shows a schematic plan view of the powertrain in FIG. 1, wherein the front of the vehicle is located at the upper portion of the figure. FIG. 2 shows the engine 101 and the transmission 102 mounted in the schematically indicated sub-frame 110. The figure shows the intermediate unit 104 connecting the engine 101 and the transmission 102. The intermediate unit 104 is arranged to allow relative rotation between the engine and the transmission housing about an axis X that is colinear with an engine output shaft 117 and a transmission input shaft 118 arranged to coincide with this axis X. These shafts are schematically indicated in the figure.

FIG. 2 further shows the first and second mounts arranged to dampen rotational vibration and displacement of the powertrain 101, 102. The first set of resilient mounts 111, 112, 113, 114 supporting the engine 101, wherein one of these mounts 114 is arranged to dampen longitudinal displacement for the entire powertrain 101, 102 along the common axis X. The second set of resilient mounts 115, 116 is shown supporting the transmission 102 and has a higher stiffness than the first set of resilient mounts 111, 112, 113, 114. FIG. 2 also shows the first and a second front wheel drive shaft 125, 126, connecting the transmission 102 to a respective first and second front wheel 127, 128. A tie bar 129 is provided for connecting the engine 101 to the vehicle body 130 in order to limit the rotational movement of the engine within the engine bay.

Figure 3A:
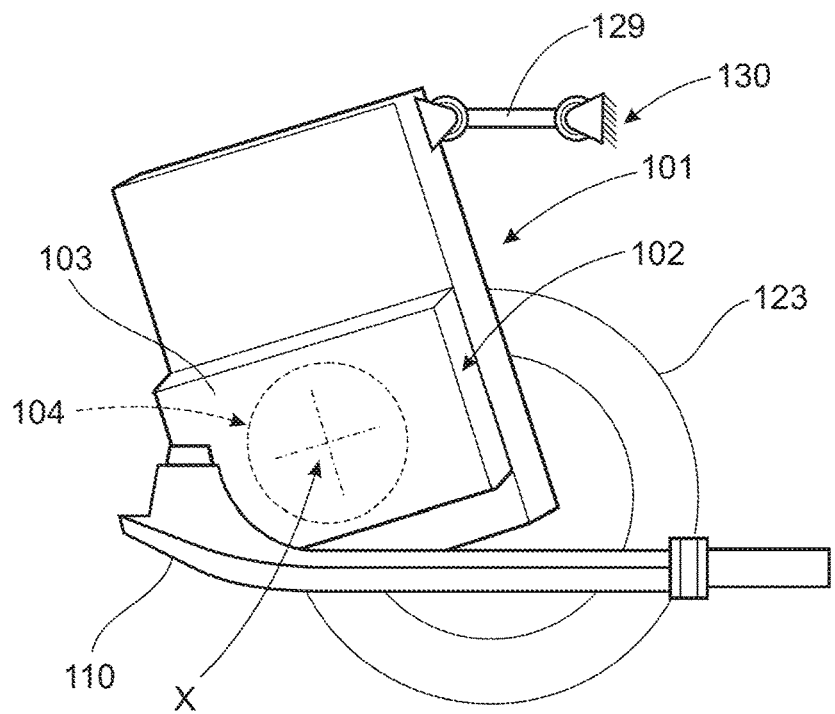
FIG. 3A-B show a side view of the powertrain schematically illustrating relative movement between the engine and transmission.
Figure 3B:
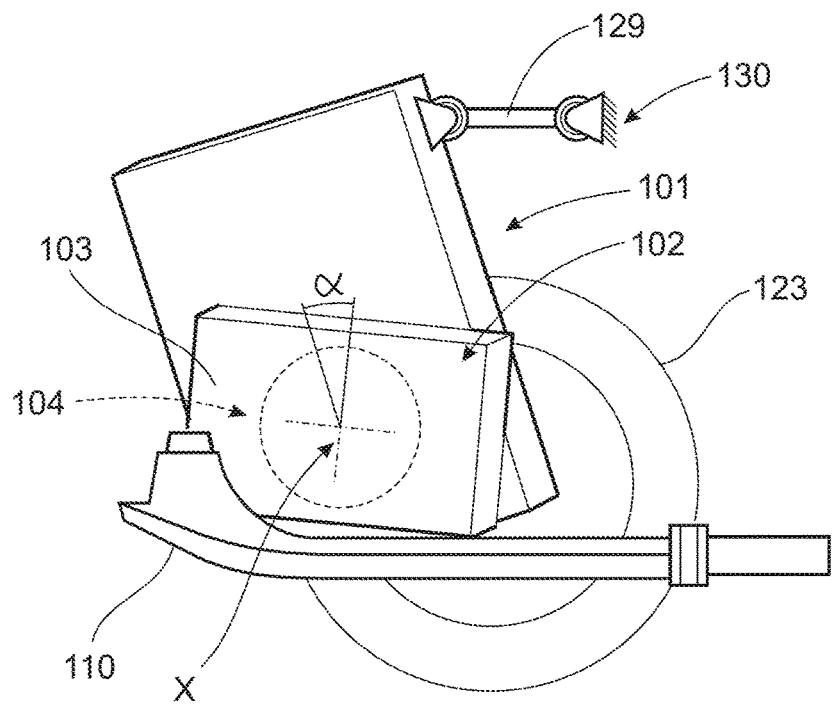

FIGS. 3A and 3B show a side view of the powertrain in FIG. 2, schematically illustrating relative movement between the engine 101 and transmission 102. In FIGS. 3A-3B the intermediate unit 104 is indicated in dashed lines located between the engine 101 and the transmission housing 103. In operation, an externally induced torque shock from a vehicle wheel 123 can be transmitted via a drive shaft (see FIG. 2) into the transmission 102 and the transmission housing 103. In a conventional powertrain, the torque shock would be transmitted from the transmission housing directly to the engine, causing a noticeable jolt. In the inventive transmission, the intermediate unit 104 is arranged to allow relative rotation between the engine 101 and the transmission housing 103 about the axis X that is collinear with the engine output shaft 117 and the transmission input shaft 118 (schematically indicated). In this way, the torque shock is dampened by the transmission mounts (see FIG. 2) attached to the sub-frame 110, causing the transmission housing 103 to rotate over an angle α, up to a predetermined maximum angle $\alpha_{max}$ relative to the engine 101. This relative rotation is exaggerated in FIG. 3B for reasons of clarity. Consequently, the torque shock is not transferred from the transmission housing 103 to the engine 101, thereby reducing noise and vibrations experienced by the driver. A tie bar 129 is provided for connecting the engine 101 to the vehicle body 130 in order to limit the rotational movement of the engine within the engine bay.

Similarly, the relatively softer engine mounts 111, 112, 113 (see FIG. 2) allow rotation of the engine 101 over an angle α, up to a predetermined maximum angle $α_{max}$. The maximum angle is determined by the maximum engine output torque and/or the available space for the respective engine in the engine bay. Consequently, rotational engine vibrations generated by the engine 101, causing it to oscillate about the crankshaft axis X, can be dampened by the engine mounts without being transferred to the transmission housing 103. This is achieved by allow the engine 101 to rotate relative to the transmission housing 103 by means of the intermediate unit 104. This has the advantage of isolating the engine 101 from the transmission 102 with respect to rotational vibrations, which allows the relatively stiff transmission mounts to be retained to prevent excessive rotation of the transmission housing 103 relative to the sub-frame 110 when high torque is transferred to the wheels, e.g. during acceleration. In this way the arrangement can reduce noise and vibrations.

Figure 4:
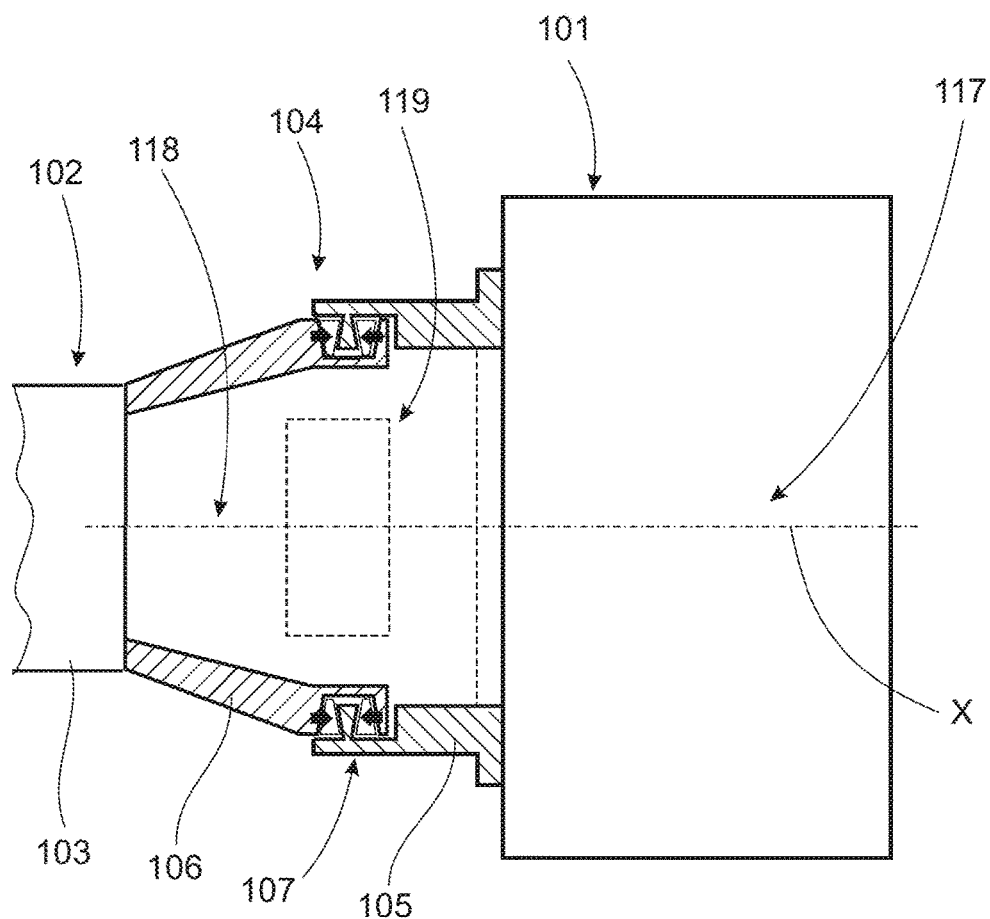
FIG. 4 shows a schematic cross-section through a first example of an intermediate unit according to the invention.

FIG. 4 shows a schematic cross-section through one example of an intermediate unit according to the invention. As described in FIGS. 1 and 2 above, the intermediate unit 104 is arranged to allow relative rotation between the engine 101 and the transmission housing 103 about an axis X that is colinear with an engine output shaft and a transmission input shaft (not shown). According to the first example, the intermediate unit 104 comprises a first component 105 connected to the engine 101 and a second component 106 connected to the transmission housing 103. The first component 105 is bolted to the engine about the engine output shaft and the second component 106 is bolted to the transmission housing 103 about the transmission input shaft at the end of the transmission housing 103 facing the engine 101. Alternatively, one or both components 105, 106 can form integrated parts of the engine 101 and the transmission housing 103, respectively. The intermediate unit 104 is arranged to at least partially enclose a transmission component 119 (schematically indicted in FIG. 4), such as a controllable clutch or a torque converter connecting the engine output shaft 117 and the transmission input shaft 118. The transmission component 119 can also represent additional components such as centrifugal pendulum absorbers and tuned mass absorbers.

The first component 105 and the second component 106 are connected by a bearing arrangement 107. In this example the bearing arrangement 107 comprises a pre-loaded double conical roller bearing, but the invention is not limited to this example. Alternative bearing arrangement can comprise ball bearings and/or a sliding bearing as described below.

Figure 5:
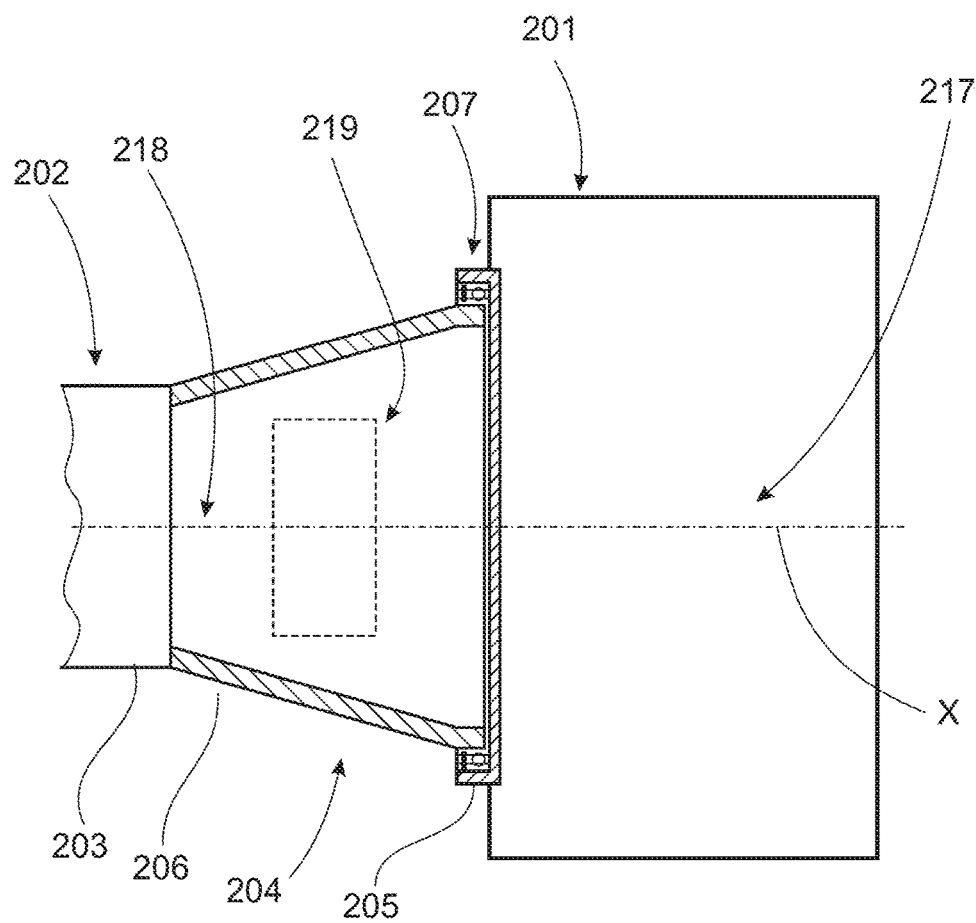
FIG. 5 shows a schematic cross-section through a second example of an intermediate unit according to the invention.

FIG. 5 shows a schematic cross-section through a second example of an intermediate unit 204 according to the invention. As described in FIGS. 1 and 2 above, the intermediate unit 204 is arranged to allow relative rotation between the engine 201 and the transmission housing 203 about an axis X that is colinear with an engine output shaft and a transmission input shaft (not shown). According to the first example, the intermediate unit 204 comprises a first component 205 connected to the engine 201 and a second component 206 connected to the transmission housing 203. The first component 205 is bolted to the engine about the engine output shaft and the second component 206 is bolted to the transmission housing 203 about the transmission input shaft at the end of the transmission housing 203 facing the engine 201. Alternatively, one or both components can form integrated parts of the engine 201 and the transmission housing 203, respectively. The intermediate unit 204 is arranged to at least partially enclose a transmission component 219 (schematically indicted in FIG. 5), such as a controllable clutch or a torque converter connecting the engine output shaft 217 and the transmission input shaft 218. According to the second example, first component 205 and the second component 206 are connected by a bearing arrangement 207. In this example the bearing arrangement 207 comprises a ball bearing arrangement where an outer bearing race 208 is formed in the first component 205, located adjacent the engine 201, and an inner bearing race 209 formed in the second component 206. A seal 210 is provided to seal the bearing from the surrounding environment.

Figure 6:
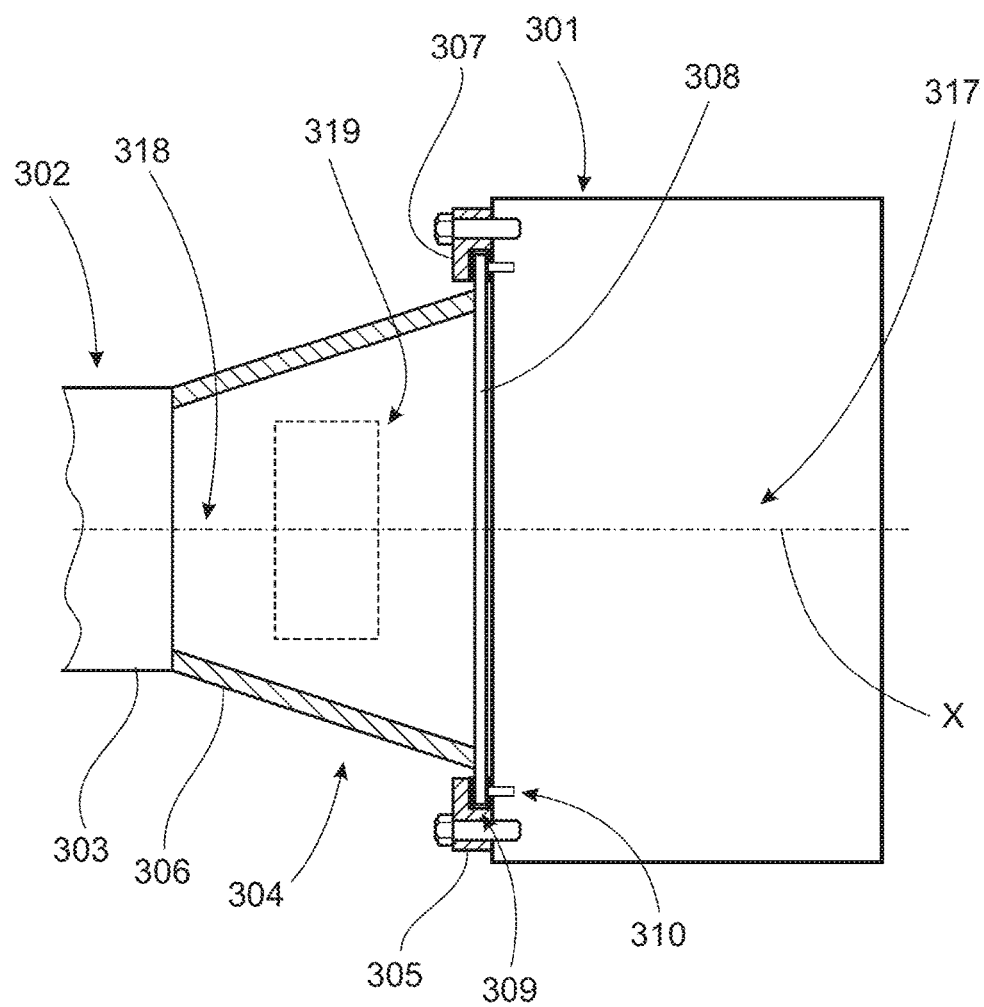
FIG. 6 shows a schematic cross-section through a third example of an intermediate unit according to the invention.

FIG. 6 shows a schematic cross-section through a third example of an intermediate unit 304 according to the invention. As described in FIGS. 1 and 2 above, the intermediate unit 304 is arranged to allow relative rotation between the engine 301 and the transmission housing 303 about an axis X that is colinear with an engine output shaft and a transmission input shaft (not shown). According to the first example, the intermediate unit 304 comprises a first component 305 connected to the engine 301 and a second component 306 connected to the transmission housing 303. The first component 305 is bolted to the engine about the engine output shaft and the second component 306 is bolted to the transmission housing 303 about the transmission input shaft at the end of the transmission housing 303 facing the engine 301. Alternatively, one or both components can form integrated parts of the engine 301 and the transmission housing 303, respectively. The intermediate unit 304 is arranged to at least partially enclose a transmission component 319 (schematically indicted in FIG. 6), such as a controllable clutch or a torque converter connecting the engine output shaft 317 and the transmission input shaft 318.

According to the third example, the first component 305 and the second component 306 of the intermediate unit 304 are connected by a pair of interconnecting flanges 307, 308. The first component 305 comprises an annular body having an inner annular groove 309 arranged to cooperate with a radial flange 308 on the second component 306. At least one flange 307, 308 has a contact surface comprising a low friction material. In FIG. 6, both radial and circumferential contact surfaces of the groove 309 and the flange 308 comprise a low friction material. The low friction material can comprise a suitable material, such as Teflon© or a similar material, and can be deposited, sprayed or adhesively attached to the desired contact surfaces. According to a further alternative, facing flanges can be separated by at least one annular ring extending radially between facing contact surfaces and comprising a low friction material. An optional circular guide ring 310 extending into a corresponding circular groove in the engine 301 can be provided in order to prevent radial movement between the first and second components 305, 306.

Figure 7:
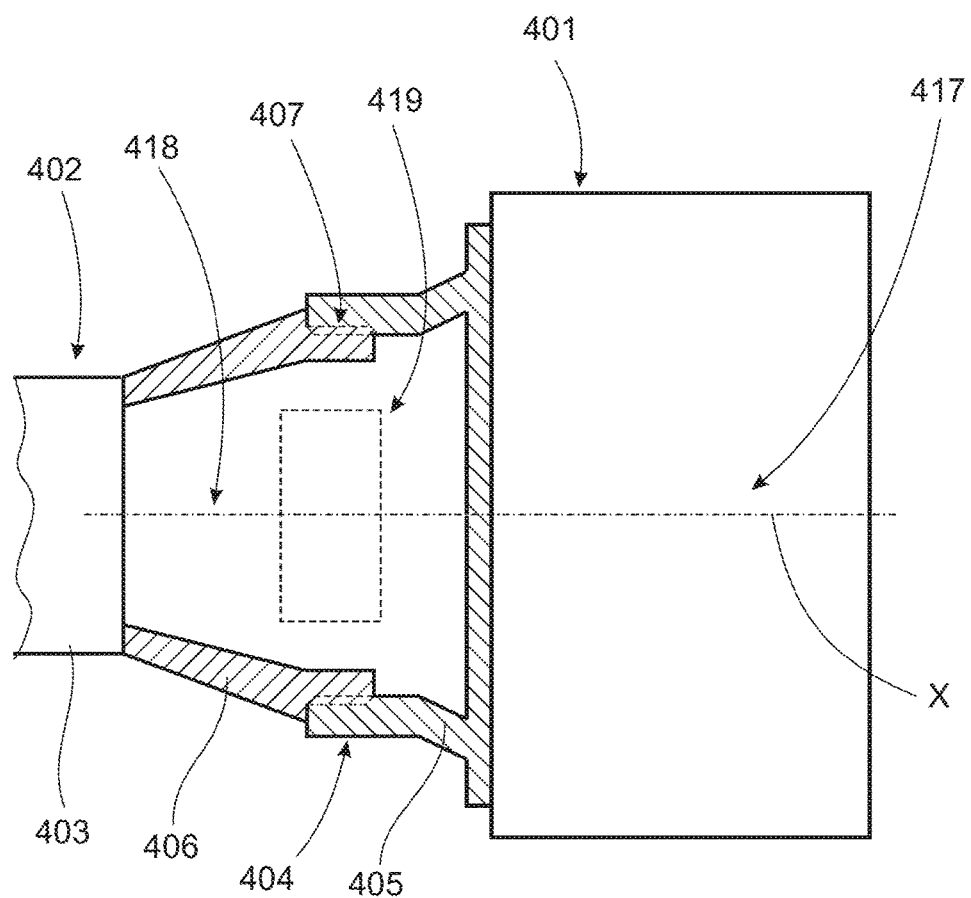
FIG. 7 shows a schematic cross-section through a fourth example of an intermediate unit according to the invention.

FIG. 7 shows a schematic cross-section through a fourth example of an intermediate unit 404 according to the invention. As described in FIGS. 1 and 2 above, the intermediate unit 404 is arranged to allow relative rotation between the engine 401 and the transmission housing 403 about an axis X that is colinear with an engine output shaft and a transmission input shaft (not shown). According to the first example, the intermediate unit 404 comprises a first component 405 connected to the engine 401 and a second component 406 connected to the transmission housing 403. The first component 405 is bolted to the engine about the engine output shaft and the second component 406 is bolted to the transmission housing 403 about the transmission input shaft at the end of the transmission housing 403 facing the engine 401. Alternatively, one or both components can form integrated parts of the engine 401 and the transmission housing 403, respectively. The intermediate unit 404 is arranged to at least partially enclose a transmission component 419 (schematically indicted in FIG. 7), such as a controllable clutch or a torque converter connecting the engine output shaft 417 and the transmission input shaft 418.

According to the fourth example, the first component 405 and the second component 406 of the intermediate unit 404 are connected by a threaded section 407 comprising mating helical surfaces. The thread section 407 is preferably self-locking to prevent any unintended axial displacement, i.e. displacement not caused by relative rotation between the engine and the transmission. Mating threads can be coated with a low friction material in the same way as described for the second example above. The mating helical surfaces can extend around the entire circumference of the intermediate unit 404, or be divided into two or more sectors. The circumferential extension of each sector must be sufficient to accommodate the relative movement between the engine and the transmission.

It is to be understood that the present invention is not limited to the embodiments described above and illustrated in the drawings; rather, the skilled person will recognize that many changes and modifications may be made within the scope of the appended claims.

What is claimed is:

1. A vehicle powertrain comprising:
   an internal combustion engine;
   a transmission driving at least two wheels; and
   an intermediate unit connecting the engine and a transmission housing enclosing the transmission,
   wherein the intermediate unit comprises:
      a first component mounted to the engine about the engine output shaft, and
      a second component mounted to the transmission housing about the transmission input shaft,
   wherein the intermediate unit is configured to allow relative rotation between the engine and the transmission housing about an axis (X) that is colinear with an engine output shaft and a transmission input shaft, and
   wherein the first component and the second component of the intermediate unit are connected by a pair of interconnecting flanges separated by at least one annular ring comprising a low friction material.

2. The vehicle powertrain of claim 1, wherein the relative rotation is allowed up to a predetermined maximum angle.

3. The vehicle powertrain of claim 1, wherein the engine and the transmission housing are mounted in a sub-frame.

4. The vehicle powertrain of claim 1, wherein the engine is mounted in a first set of resilient mounts and the transmission housing is mounted in a second set of resilient mounts.

5. The vehicle powertrain of claim 4, wherein the first set of resilient mounts has a lower stiffness than the second set of resilient mounts.

6. The vehicle powertrain of claim 5, wherein the stiffness of the first set of resilient mounts is up to 1/10 of the stiffness of the second set of resilient mounts.

7. The vehicle powertrain of claim 1, wherein the first component and the second component of the intermediate unit are connected by a bearing arrangement.

8. The vehicle powertrain of claim 7, wherein the bearing arrangement comprises a pre-loaded bearing.

9. The vehicle powertrain of claim 8, wherein the pre-loaded bearing comprises a double conical roller bearing.

10. The vehicle powertrain of claim 7, wherein the bearing arrangement comprises a ball bearing.

11. The vehicle powertrain of claim 1, wherein the intermediate unit is arranged to at least partially enclose a rotary component that includes at least one of: a controllable clutch, a torque converter, a centrifugal pendulum absorber, or a tuned mass absorber.

12. A vehicle powertrain comprising:
   an internal combustion engine;
   a transmission driving at least two wheels; and
   an intermediate unit connecting the engine and a transmission housing enclosing the transmission,
   wherein the intermediate unit comprises:
      a first component mounted to the engine about the engine output shaft, and
      a second component mounted to the transmission housing about the transmission input shaft,
   wherein the intermediate unit is configured to allow relative rotation between the engine and the transmission housing about an axis (X) that is colinear with an engine output shaft and a transmission input shaft,
   wherein the first component and the second component of the intermediate unit are connected by a bearing arrangement,
   wherein the bearing arrangement comprises a pre-loaded bearing, and
   wherein the pre-loaded bearing comprises a double conical roller bearing.

13. The vehicle powertrain of claim 12, wherein the engine is mounted in a first set of resilient mounts and the transmission housing is mounted in a second set of resilient mounts.

14. The vehicle powertrain of claim 13, wherein the first set of resilient mounts has a lower stiffness than the second set of resilient mounts.

15. The vehicle powertrain of claim 12, wherein the first component and the second component of the intermediate unit are connected by a pair of interconnecting flanges, and wherein at least one flange has a contact surface comprising a low friction material.

16. The vehicle powertrain of claim 12, wherein the intermediate unit is arranged to at least partially enclose a rotary component that includes at least one of: a controllable clutch, a torque converter, a centrifugal pendulum absorber, or a tuned mass absorber.

17. A vehicle powertrain comprising:
   an internal combustion engine;
   a transmission driving at least two wheels; and
   an intermediate unit connecting the engine and a transmission housing enclosing the transmission,
   wherein the intermediate unit comprises:
      a first component mounted to the engine about the engine output shaft; and
      a second component mounted to the transmission housing about the transmission input shaft,
   wherein the intermediate unit is configured to allow relative rotation between the engine and the transmission housing about an axis (X) that is colinear with an engine output shaft and a transmission input shaft, and wherein the first component and the second component of the intermediate unit are connected by a thread comprising mating helical surfaces.

18. The vehicle powertrain of claim 17, wherein the engine is mounted in a first set of resilient mounts and the transmission housing is mounted in a second set of resilient mounts.

19. The vehicle powertrain of claim 18, wherein the first set of resilient mounts has a lower stiffness than the second set of resilient mounts.

20. The vehicle powertrain of claim 17, wherein the intermediate unit is arranged to at least partially enclose a rotary component that includes at least one of: a controllable clutch, a torque converter, a centrifugal pendulum absorber, or a tuned mass absorber.

\* \* \* \* \*